United States Patent
Kapauan et al.

(10) Patent No.: US 7,210,069 B2
(45) Date of Patent: Apr. 24, 2007

(54) FAILURE RECOVERY IN A MULTIPROCESSOR CONFIGURATION

(75) Inventors: Alejandro A. Kapauan, Lisle, IL (US); Michael John Lemke, Plainfield, IL (US); Harvey Rubin, Morristown, NJ (US); Omar Hernando Salvador, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 645 days.

(21) Appl. No.: 10/436,062

(22) Filed: May 13, 2003

(65) Prior Publication Data

US 2004/0230875 A1 Nov. 18, 2004

(51) Int. Cl.
*G06F 11/00* (2006.01)

(52) U.S. Cl. ........................................ 714/43
(58) Field of Classification Search ............. 714/43, 714/4, 11, 13, 47; 709/104, 220, 221
See application file for complete search history.

(56) References Cited

U.S. PATENT DOCUMENTS

| 4,639,864 A * | 1/1987 | Katzman et al. ............. 714/14 |
| 5,020,059 A * | 5/1991 | Gorin et al. ................. 714/3 |
| 5,790,772 A * | 8/1998 | Badovinatz et al. .......... 714/4 |
| 6,026,448 A * | 2/2000 | Goldrian et al. ............ 709/212 |
| 6,665,811 B1 * | 12/2003 | de Azevedo et al. .......... 714/4 |
| 6,865,157 B1 * | 3/2005 | Scott et al. ................ 370/242 |
| 2003/0088698 A1 * | 5/2003 | Singh et al. ............... 709/239 |

* cited by examiner

*Primary Examiner*—Nadeem Iqbal (57) ABSTRACT

A multiprocessor configuration includes a plurality of processing groups connected to form both a first and second communication path, and an interpath connection connecting the first and second communication paths. The first and second communication paths and the interpath connection provide allow communication between processors in different processing groups even if one processing group fails and, thus, creates a discontinuity in both the first and second communication paths. One or more processors in each processing group may be operable to perform fault recovery in response to a detected failure in another processing group.

15 Claims, 5 Drawing Sheets

FAILURE RECOVERY IN A MULTIPROCESSOR CONFIGURATION

BACKGROUND OF THE INVENTION

1. Field of the Invention

The present invention relates to a multiprocessor configuration and, particularly, to fault recovery in a multiprocessor system.

2. Description of the Related Art

Many software applications can benefit from being distributed across a plurality of processors. Using multiple processors helps increase the processing capacity of the system and provide resiliency to the application in case a failure occurs in a processing component. Further, partitioning the application functions across sets of processing elements can simplify the design of the system. In order to distribute the processing of a software application across a multiprocessor arrangement, the processors need to communicate with one another.

In conventional multiprocessor configurations, multiple processors can be implemented in a processing group. Such processing groups include an access point, which is linked to each of the processors in the group. For example, the access point may comprise a switching element capable of channeling incoming and outgoing data to and from any of the connected processors in the processing group.

Multiple processing groups can transfer data amongst each other by connecting the access points of the processing groups with communication lines. For example, the access points may be connected in series (i.e., using a daisy chain connection) by the communication lines, thus providing a series connection between the processing groups.

In one particular example, a processing group may be implemented as a circuit pack that plugs into a chassis, or shelf. A plurality of such shelves can be mounted in a cabinet. As described above, the processing groups of each shelf may be connected in series, via the access points to allow the processing groups in the cabinet to communicate with one another.

The total number of processors in a single processing group may be limited by factors including the number of processors per plug-in, the number of plug-in boards per shelf, and the number of shelves per cabinet. To further increase the available processing capacity, multiple cabinets can be connected together into a single communications network.

While such multiprocessor configurations can provide a large number of processors, they also increase the number of potential system failures that can affect performance. Such failures can include the failure of a particular processor, the failure of an entire processing group, and the failure of multiple processing groups successively connected (e.g., resulting from the failure of an entire cabinet) in a multiprocessor configuration. Many of these types of failures can cause some of the surviving components to be isolated from each other, and therefore, unable to communicate with one another.

For example, such isolation may occur when the failure of a processing group may render its access point inoperable. This can result in a discontinuity in the series connection of processing groups. In other words, processing groups connected at one side of the failed processing group in the series connection cannot communication to those processing groups that are connected on the other side.

Thus, the interconnection scheme implemented for the processing groups plays a critical role in the degree to which the system can recover from component, shelf, or cabinet failures. Fault recovery algorithms that are executed for the purpose of detecting such failures and recovering the remaining parts of the system of processors also play a critical part in determining the effectiveness of the system's recovery capabilities.

SUMMARY OF THE INVENTION

An exemplary embodiment of the present invention is directed to a multiprocessor configuration, which includes a plurality of processing groups connected to form both a first and second communication path, and an interpath connection connecting the first and second communication paths. Each processing group includes at least one processor.

In an exemplary embodiment, the first and second communication paths and the interpath connection allow communication between processors in different processing groups even if one processing group fails and, thus, creates a discontinuity in both the first and second communication paths.

In an exemplary embodiment, each processing group includes a first and second access point, which selectively connects each processor in the processing group to the first and second communication paths, respectively.

Another exemplary embodiment is directed to a method for performing fault recovery in such a multiprocessor configuration. Such a method includes polling, at one of the processing groups, the first and second access points of another processing group to detect failures that create a discontinuity in the first and/or second communication paths, and controlling each processor in the processing group to connect to one of the first and second access points based on the polling step.

BRIEF DESCRIPTION OF THE DRAWINGS

The present invention will become more fully understood from the detailed description given below and the accompanying drawings, which are given for purposes of illustration only, and thus do not limit the present invention. In the drawings, like reference numbers and symbols refer to like features.

DETAILED DESCRIPTION OF EXEMPLARY EMBODIMENTS

Exemplary embodiments of the present invention are directed to a multiprocessor configuration that allows for recovery from a failure with respect to a processor, an access point, a processing group, or failures with respect to multiple processing groups that are successively connected in a series connection. Exemplary embodiments of the present invention are also directed to a method that takes advantage of this configuration and allows for recovery from the failures indicated above.

In this description, "configuration" refers to the interconnections among the processors and access points in a processing group, including both active and standby communication links. Configuration also refers to the interconnections among the processing groups.

It should also be noted that the configuration may include various implementations of the processing groups. For example, the processing groups may be implemented in a multi-shelf and/or multi-cabinet system. In such a system, each processing group may be implemented in a separate shelf, and one or more shelves may be implemented in a cabinet.

"Recovery" refers to one or more corrective actions or procedures performed in response to the failure of a link, processor, access point, processing group, or series of processing groups, by which the configuration of surviving (i.e., non-failing) components maintains a complete working system. Such recovery is performed to help prevent surviving parts from being isolated in their ability to communicate with the other surviving parts of the system.

It should be noted that, as used in this description, "processor" may include, but is not limited to, any type of processor, microprocessor or logic chip that executes instructions, or any type of processor board or processing device containing one or more processors that execute instructions.

To provide recovery in an exemplary embodiment, a fault recovery algorithm is performed to detect one or more failures of the aforementioned types, and to perform, or initiate, recovery based on the detected failures. The solution is applicable to systems comprised of any number of processing groups.

Figure 1:
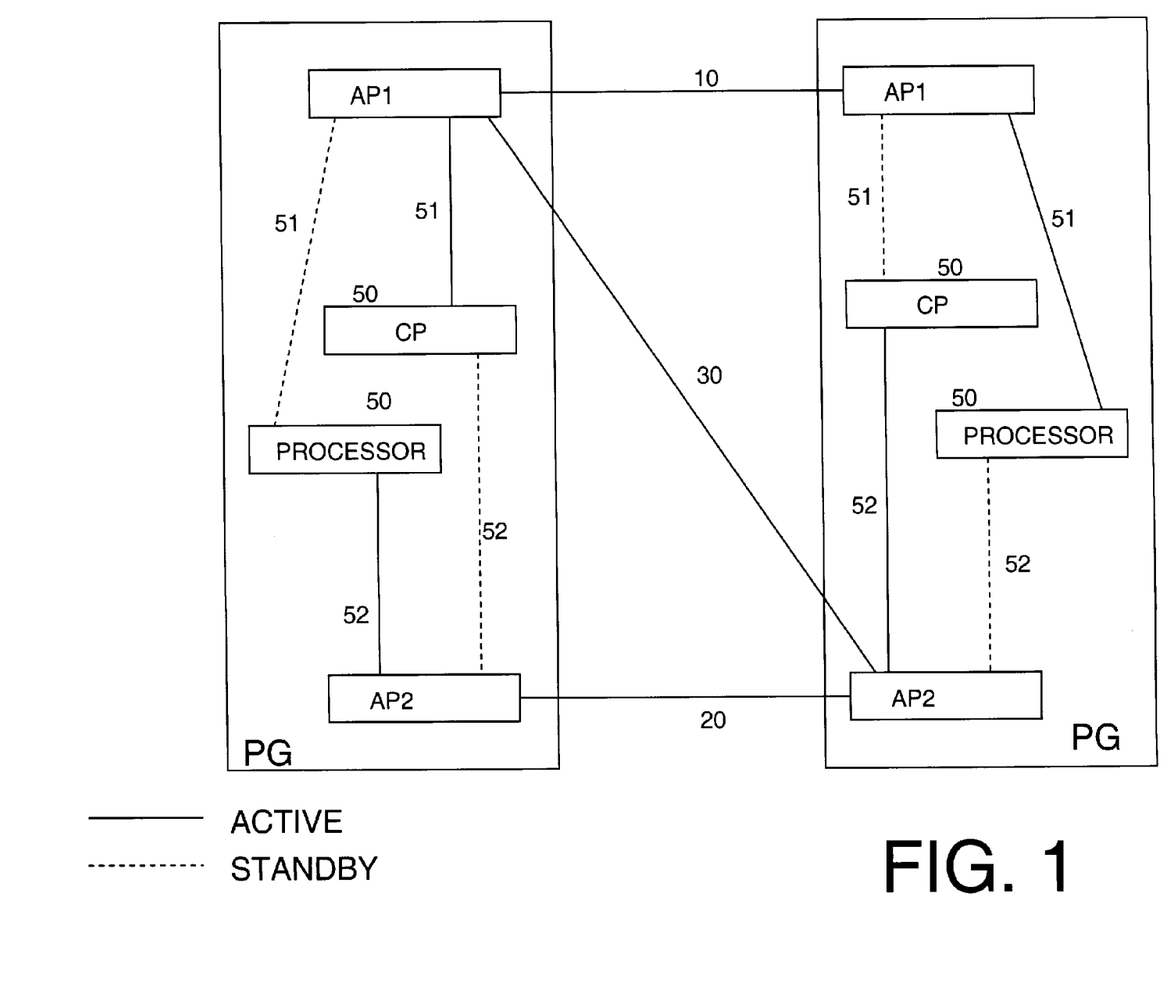
FIG. 1 illustrates the configuration and interconnections in a multiprocessor configuration including two processing groups, according to an exemplary embodiment of the present invention.

According to an exemplary embodiment, the multiprocessor system includes a plurality of processing groups that are connected to form at least a first and second communication path. FIG. 1 illustrates the configuration and interconnections in a multiprocessor configuration including two processing groups PG, according to an exemplary embodiment of the present invention.

It should be understood that FIG. 1 is only illustrative of an exemplary embodiment, and thus, should not be construed as limiting. While FIG. 1 illustrates each processing group PG as including two processors 50, one of which is a control processor CP, it should be understood that each processing group PG may include any number of processors 50 as will be contemplated by those skilled in the art. Also, according to exemplary embodiments, the processing group may include no control processor CP, or multiple control processors CP.

In FIG. 1, the processing groups PG are connected to form a first communication path 10 and second communication path 20. In an exemplary embodiment, the first and second communication paths 10, 20 may comprise first and second series connections (e.g., daisy chain connections) between the processing groups PG.

Each of the first and second communication paths 10 and 20 can be implemented using network communication lines to connect the processing groups. For example, the first and second communication paths 10 and 20 may utilize an type of local area network (LAN) communication lines, including, but not limited to, Ethernet cables, twisted pair copper wires, optical fibers, and the like.

Furthermore, the communication paths 10 and 20 may utilize various types of wide area network (WAN) communication links if, for example, different processing groups in the multiprocessor configuration include processing groups PG in dispersed locations.

Referring to FIG. 1, each processing group PG includes a first access point AP1, a second access point AP2, and one or more processors 50. Each processor includes two communication lines 51 and 52, which are respectively connected to the access points AP1 and AP2 of its respective processing group PG.

The first access point AP1 provides a connection between each of the processors 50 and the first communication path 10 via lines 51. Likewise, second access point AP2 provides a connection between each of the processors 50 and the second communication path 20 via lines 52. The first and second access points AP1, AP2 may include, but are not limited to, any type of switching cards, desktop switches, routers, repeaters, and each separate port in a multiport switch. For example, when the processing groups of a system are interconnected by an Ethernet LAN, a access point may comprise an Ethernet switching card (ESC) plugged into the processing group PG itself.

Thus, the first and second communication paths 10 and 20 can be thought of as two distinct networks formed by the set of interconnected first access points AP1 and second access points AP2, respectively.

In an exemplary embodiment, only one of the communication lines 51 and 52 for each processor 50 will be an active connection. Each processor 50 can choose which of these lines 51, 52 is active, and thus, choose to which access point AP1 and AP2 it is actively connected. Accordingly, each processor 50 can select whichever one of the first and second communication paths 10 and 20 it wants to use to transmit and receive data, e.g., to communicate with other processors 50 in its own processing group PG or other processing groups PG. FIG. 1 illustrates the active communication line 51/52 with a solid line, while the non-active line 51/52 (i.e., standby connection) is illustrated with a dotted line.

Thus, in an exemplary embodiment, each processor 50 in a processing group PG is selectively connected to the first communication path 10 through the processing group's first access point AP1, and selectively connected to the second communication path 20 through the processing group's second access point AP2. The use of multiple access points AP1 and AP2 introduces a form of redundancy, so that the failure of one access point does not cause a complete isolation of the processors 50 in the corresponding processing group PG.

As shown in FIG. 1, the multiprocessor configuration includes an interpath connection 30, which connects the first access point AP1 of one of the processing groups PG to the second access point AP2 of the other processing group PG. Thus, the interpath connection 30 connects the first and second communication paths 10 and 20 to one another.

The access point of each processing group PG in FIG. 1, which is directly connected to the interpath connection 30, is referred to herein as the "interpath access point" of the corresponding processing group PG. Accordingly, the other access point of the same processing group PG is referred to as the "non-interpath access point."

As mentioned above, the interpath access points will be the first access point AP1 of one processing group (i.e., the AP1 of the left-side processing group PG in FIG. 1) and the second access point AP2 of the other processing group PG (i.e., the AP2 of the right-side processing group PG in FIG. 1).

It should be noted that, in an alternative embodiment, the interpath connection 30 may be configured to connect the first and second access points AP1 and AP2 of the same processing group PG. In such an embodiment, the interpath access points would be the first and second access points AP1 and AP2 of the same processing group PG. Such an alternative embodiment allows failure recovery in a multiprocessor configuration that includes two processing groups PG.

As described above, the first and second communication paths 10 and 20 utilize connections between the first and second access points AP1 and AP2, respectively, of different processing groups PG. The interpath connection 30 similarly utilizes connections between two interpath access points of different processing groups PG (or, possibly, the same processing group PG). In an exemplary embodiment, the connections used by the first and second communication paths 10 and 20, as well as the interpath connection 30, may be formed with multiple communication lines (e.g., multiple Ethernet cables) to protect against the failure of any one communication line, or the failure of a port device to which such a line connects.

Such connections can be operated as a collected set of links, referred to as a Link Aggregation Group (LAG) in the art. For instance, packets are distributed across a LAG by the transmitting device, and if one link of a LAG fails, the packets are distributed across the surviving links. Since multiple, simultaneous failures are rare, failures in the connections of the first and second communication paths 10 and 20, as well as the interpath connection 30, can be avoided.

The combination of the first and second communication paths 10 20 and interpath connection 30 allows for communications between any of the processors 50 in the two processing groups of FIG. 1, despite any single failure that disables an access point AP1 or AP2, or disables a processor's active connection 51 or 52 to an access point. In other words, the configuration of FIG. 1 provides each processor 50 with a path to a surviving access point in both processing groups.

A fault recovery algorithm, as described below in accordance to an exemplary embodiment, allows each processor 50 to determine which of the access points AP1, AP2 in its processing group PG provides such a path. Thus, each processor 50 can make a corresponding communication line 51 or 52 active in response to the algorithm. However, the below algorithm is merely illustrative of a type of algorithm that can be performed to enable such communications. Exemplary embodiments of the multiprocessor configuration described herein are not limited to a particular fault recovery algorithm; the present invention covers any such algorithm that can be used in connection with such embodiments.

Figure 2:
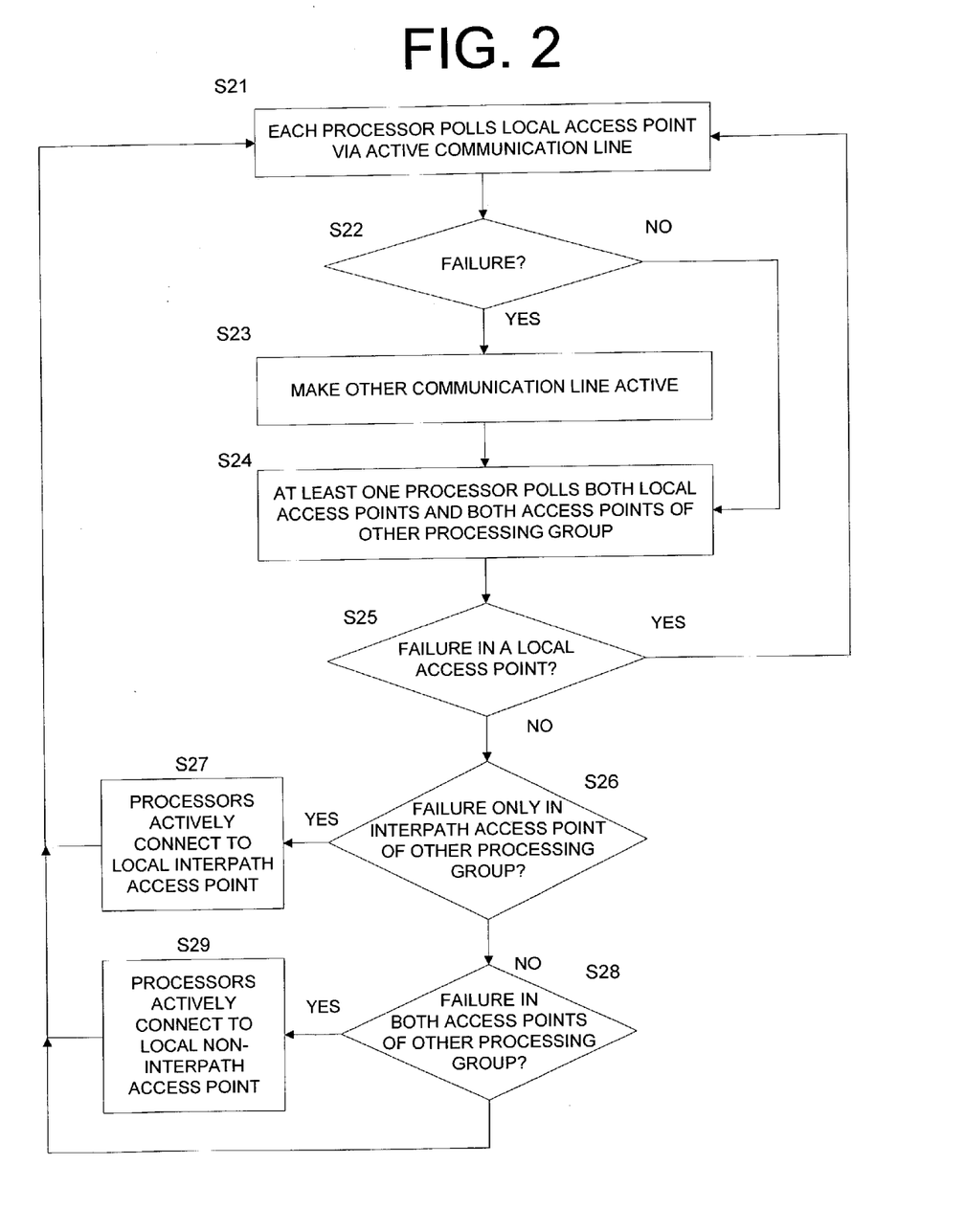
FIG. 2 is a flowchart illustrating a fault recovery process for a processing group in a multiprocessor configuration including two processing groups, according to an exemplary embodiment of the present invention.

FIG. 2 is a flowchart illustrating a fault recovery process for a processing group PG in a multiprocessor configuration including two processing groups PG, according to an exemplary embodiment of the present invention.

In step S21, each processor 50 polls the access point AP1/AP2 in the same processing group PG to which it is actively connected. In other words, the processor 50 transmits polling messages over its active communication line 51/52 to the corresponding access point AP1/AP2. Such polling messages may be sent, for example, at a periodic rate.

In decision block S22, each processor 50 determines whether a failure has occurred with respect to the polled access point AP1/AP2. For example, if the processor 50 receives a response to the polling of step S21, it determines that no recovery action is required. However, in an exemplary embodiment, if a number N of consecutive poll responses are missed (N≧1), the processor 50 may determine that a failure has occurred with respect to the polled access point AP1/AP2.

If a processor 50 detects such a failure, it performs a recovery action by actively connecting to the other access point AP2/AP1 of the processing group PG, as shown in step S23. The processor 50 does this by making its other communication line 52/51 (i.e., the standby connection) active. For example, if a processor's active connection is communication line 51, and the processor 50 detects a failure with respect to the first access point AP1 in its processing group PG, the processor 50 may make communication line 52 the active connection (thus making 51 the standby connection).

At least one of the processors 50 in each processing group PG polls both local access points AP1 and AP2 of the processing group PG, and the first and second access points AP1 and AP2 of the other processing group PG. For instance, processor 50 may poll the access points AP1 and AP2 in its own processing group PG, and both access points AP1 and AP2 in the other processing group PG, at the same time, i.e., in step S21. Alternatively, the polling of the other local access point and/or the access points of the other processing group PG may be performed as a separate step (as shown in S24).

In an exemplary embodiment, each processing group PG may include a control processor CP that performs the additional polling of step S24. In such an embodiment, the control processor CP may also initiate fault recovery in the subsequent steps of FIG. 2, e.g., by sending commands or alerts to the other processors 50 in its processing group PG.

However, in an alternative embodiment, each processor 50 in a processing group may be operable to poll the other processing group's access points AP1 and AP2. For purposes of illustration only, the embodiment in which a control processor CP performs the polling of step S24 will be described below.

In decision block S25, the control processor CP determines whether a failure is detected with respect to either of the local access points AP1, AP2 of its processing group PG. If so, then the control processor CP determines that no further fault recovery action is required (because any necessary fault recovery has already been performed by each processor according to steps S21–S23). Thus, processing returns to step S21 where periodic polling occurs.

However, if no faults were detected with respect to the local first and second access points AP1 and AP2, fault recovery actions may be initiated by the control processor CP in response to detected failures with respect to either of the access points AP1 and AP2 of the other processing group PG, according to steps S26–S29. As described above, the control processor CP may detect a fault with respect to a certain access point in the other processing group PG when that access point fails to respond to N successive poll messages (N≧1).

For the purpose of polling the Access Points in another PG, the CP uses its interface to communication line 51 to poll along communications path 10 to the first access point AP1 in another PG, and uses its interface to communication line 52 to poll along communications path 20 to the second access point AP2 in another PG. In other words, these poll messages are not sent across the interpath connection 30.

A failure detected in response to the first access point AP1 of the other processing group represents a discontinuity in the first communication path 10; likewise, a failure in the second access point AP2 of the other processing group represents a discontinuity in the second communication path 20.

Steps S26–S29 describe the types of fault recovery the control processor CP may initiate when a failure is detected in response to Step S24.

As shown in decision block S26, a determination is made as to whether a failure is detected with respect to the interpath access point of the other processing group PG, but no failure is detected with respect to the non-interpath access point of the other processing group PG. If the conditions of decision block S26 are met, step S27 is performed.

In step S27, the control processor CP controls each of the processors 50 in its processing group PG to actively connect to the interpath access point of its own processing group PG (i.e., by controlling each processor 50 to make the corresponding communication line 51/52 active). Thereafter, fault recovery is concluded, and the periodic polling of step S21 is performed.

On the other hand, if the conditions of step S26 are not met, then the process continues to decision block S28. At decision block S28, a determination is made as to whether failures have been detected with respect to both access points AP1 and AP2 of the other processing group PG.

If the conditions of decision block S28 are met, step S29 is performed. In step S29, the control processor CP controls each of the processors 50 in its processing group to actively connect to the non-interpath access point of its own processing group PG. Thereafter, fault recovery concludes.

If the conditions of decision block S28 are not met, the fault recovery process concludes, and the periodic polling of step S21 is performed.

It should be noted that in an alternative exemplary embodiment, if the conditions of decision block S28 are met, the control processor CP can control each of the processors 50 in the same processing group PG to actively connect to the interpath access point (not shown). In other words, for the multiprocessor configuration of FIG. 1, the control processor CP can control each processor 50 in its processing group PG to actively connect to either the interpath or non-interpath access points of the same processing group PG, as long as it controls the processors 50 to actively connect to the same access point.

According to an exemplary embodiment, the control processor CP may control each processor 50 in its processing group PG to actively connect to a particular access point AP1 or AP2 by multicasting an alert or instruction to each processor 50 in its processing group PG.

The control processor CP may, alternatively, only multicast such an alert or instruction to each processor 50 that needs to make its standby connection active. For example, if the control processor CP wants to instruct each processor 50 to actively connect to the first access point AP1, the control processor CP may generate an alert that is transmitted only over communication line 52 of each processor. Thus, only those processors 50 actively connected to the second access point AP2 (i.e., processors that are "listening" over line 52) will receive the alert, and make the other communication line 51 active.

In an alternative embodiment, instead of one control processor CP performing steps S24–S29 for each processing group PG, these steps may be performed individually by each processor 50. For example, each processor 50 may be configured to poll both access points AP1 and AP2 in its own processing group PG and the other processing group PG of FIG. 1. Accordingly, each processor may be operable to perform the fault recovery described above by choosing one of its communication lines 51 or 52 to be active based on the algorithm described above with respect to FIG. 2.

Figure 3:
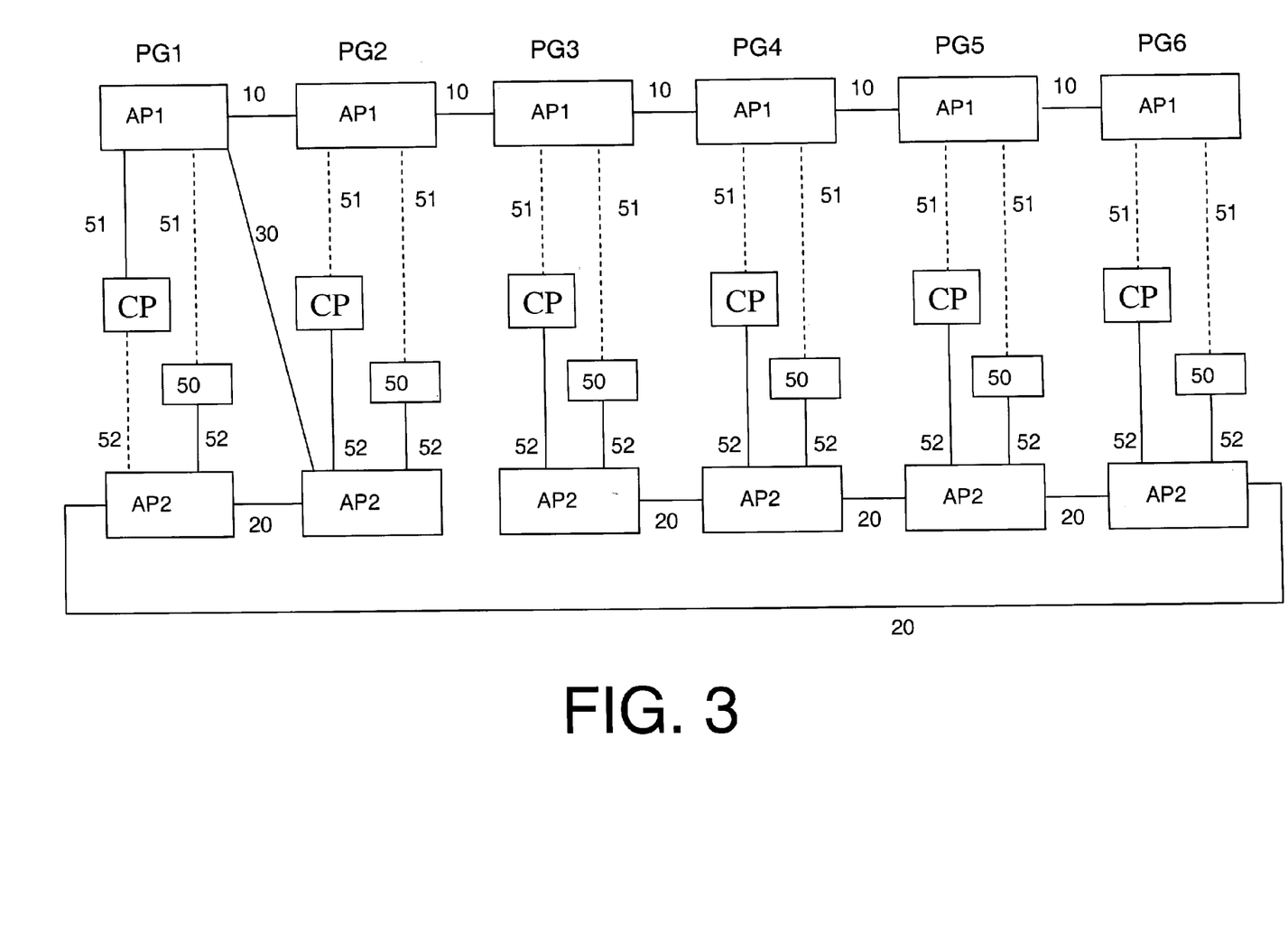
FIG. 3 illustrates the configuration and interconnections in a multiprocessing configuration including three or more processing groups, according to an exemplary embodiment of the present invention.

FIG. 3 illustrates the configuration and interconnections in a multiprocessing configuration including three or more processing groups, according to an exemplary embodiment of the present invention.

It should be understood that FIG. 3 is only illustrative of an exemplary embodiment and should not be construed as limiting. For example, while FIG. 3 illustrates six processing groups PG1–PG6, it will be obvious to those of ordinary skill in the art that exemplary embodiments of the present invention are not limited to a specific number of processing groups PG.

Furthermore, while FIG. 3 illustrates each processing group PG as including two processors 50, one of which is a control processor CP, it should be understood that each processing group PG may include any number of processors 50 as will be contemplated by those skilled in the art. Also, in exemplary embodiments, the processing group PG may include no control processor CP, or multiple control processors CP.

In an exemplary embodiment, the multiprocessor configuration can include any number of processing groups PG, as required by the application.

Similar to the embodiment illustrated in FIG. 1, each processing group PG includes a first access point AP1, a second access point AP2, and one or more processors 50. Each processor 50 includes two communication lines 51 and 52, which are respectively connected to the access points AP1 and AP2 of its respective processing group PG.

The processing groups PG are connected to form a first communication path 10 and second communication path 20. In an exemplary embodiment, the first and second communication paths 10 and 20 can be first and second series connections between the processing groups PG.

Similar to the processing groups PG of FIG. 1, two of the processing groups shown in FIG. 3 (i.e., processing groups PG1 and PG2) are also connected via an interpath connection 30. For purposes of description, processing groups PG1 and PG2 will be referred to herein as "interpath processing groups." Accordingly, processing groups PG3–PG6 can be referred to as "non-interpath processing groups."

Specifically, the interpath connection 30 connects a first access point AP1 in the interpath processing group PG1 to the second access point AP2 of interpath processing group PG2. As mentioned above, the access points connected directly to the interpath connection 30 can be referred to as "interpath access points."

Referring to FIG. 3, the first communication path 10 is configured differently than the second communication path 20. In particular, the first communication path 10 is a series connection (e.g., daisy chain connection) of first access points AP1, which begins at the interpath access point AP1 of interpath processing group PG1. The first communication path 10 continues to the first access point AP1 of interpath processing group PG2, and then to the first access point AP1 of non-interpath processing group PG3, and PG4, etc., until it terminates at the first access point AP1 of the final processing group in the series connection, i.e., non-interpath processing group PG6.

As shown in FIG. 3, the second communication path 20 is a serial connection (e.g., daisy chain connection) of second access points AP2 that starts at the interpath access point AP2 of interpath processing group PG2. The second communication path 20 continues to the second access points AP2 of interpath processing group PG1, and then to the second access points AP2 of non-interpath processing groups PG6 and PG5, etc., until it terminates at the second access point AP2 of non-interpath processing group PG3.

Accordingly, the first and second communication paths 10 and 20 each provide a series connection between non-interpath processing groups PG3–PG6. Furthermore, each of the first and second communication paths 10 and 20 allow data signals to propagate from the interpath processing groups PG1 and PG2 to separate ends of the series connection of non-interpath processing groups PG3–PG6.

Thus, in this exemplary embodiment, the combination of the first and second communication paths 10 and 20 and interpath connection 30 can provide a path for communications between any two processing groups PG even when a failure occurs that creates a discontinuity in both the first and second communication paths 10 and 20.

The multiprocessor configuration illustrated in FIG. 3 thus allows for fault recovery to occur. For example, when a failure occurs with respect to an entire processing group (e.g., both access points AP1 and AP2 of a processing group PG become inoperative), which causes discontinuities in both the first and second communication paths 10 and 20, fault recovery can be performed and the remaining processing groups PG will still be able to communicate with one another.

Also, if a failure occurs with respect to multiple processing groups PG successively connected in the first and second communication paths 10 and 20, fault recovery can be performed in the configuration shown in FIG. 3 to allow any two processing groups PG to communicate with one another. For example, in a multi-cabinet system, a failure may occur with respect to an entire cabinet, which renders the first and second access points AP1 and AP2 of each of the processing groups PG in the cabinet to be inoperative. Fault recovery, according to this exemplary embodiment, will enable processing groups PG outside of the failing cabinet to communicate with one another.

According to the fault recovery algorithms described below, in accordance to an exemplary embodiment, each processor 50 is controlled to actively connect to a particular access point AP1 or AP2 in response to a detected failure. It should be noted that the algorithms described below are merely illustrative of a type of fault recovery algorithm that can be performed in the multiprocessor configuration of the present invention. The present invention is not limited to a particular fault recovery algorithm, and covers any algorithm providing fault recovery for any of the multiprocessor configurations described herein.

In an exemplary embodiment, fault recovery can be performed for each of the processors 50 in the interpath processing groups PG1 and PG2 according to the algorithm described above with respect to FIG. 2.

In such an embodiment, each processor 50 of each of the interpath processing groups PG1 and PG2 will poll the local access points AP1 and AP2 (the access points associated with the processor's own processing group PG) according to steps S21–S23. In step S24, at least one of the processors 50 (e.g., the control processor CP) of a respective interpath processing group PG1/PG2 will poll the access points AP1 and AP2 of the other interpath processing group PG2/PG1. Thereafter, the polling processor 50 will perform steps S25–S29 in accordance in response to any detected failures (or lack thereof) with respect to the access points AP1 and AP2 of the other interpath processing group PG2/PG1.

As described above, steps S25–S29 can be performed by a control processor CP, or by each processor 50 in the interpath processing group PG1/PG2. It should be noted that the control processor CP of the interpath processing groups PG1/PG2 may control each processor 50 in the same processing group PG1/PG2 to actively connect to a particular local access point AP1 or AP2 in a manner similar to that described above with respect to FIG. 2.

In an exemplary embodiment, a processor 50 (e.g., the control processor CP) in an interpath processing group PG1/PG2 may determine that there are failures with respect to the first and second access points AP1 and AP2 of the other interpath processing group PG2/PG1, based on decision block S28. In this situation, the processors 50 in the same interpath processing group PG1/PG2 should be controlled in step S29 to actively connect to the local non-interpath access point. The reason is that the non-interpath access point of each interpath processing group PG1 and PG2 is connected to the serial connection of non-interpath processing groups PG3–PG6 in the corresponding communication path 10, 20.

Figure 4A:
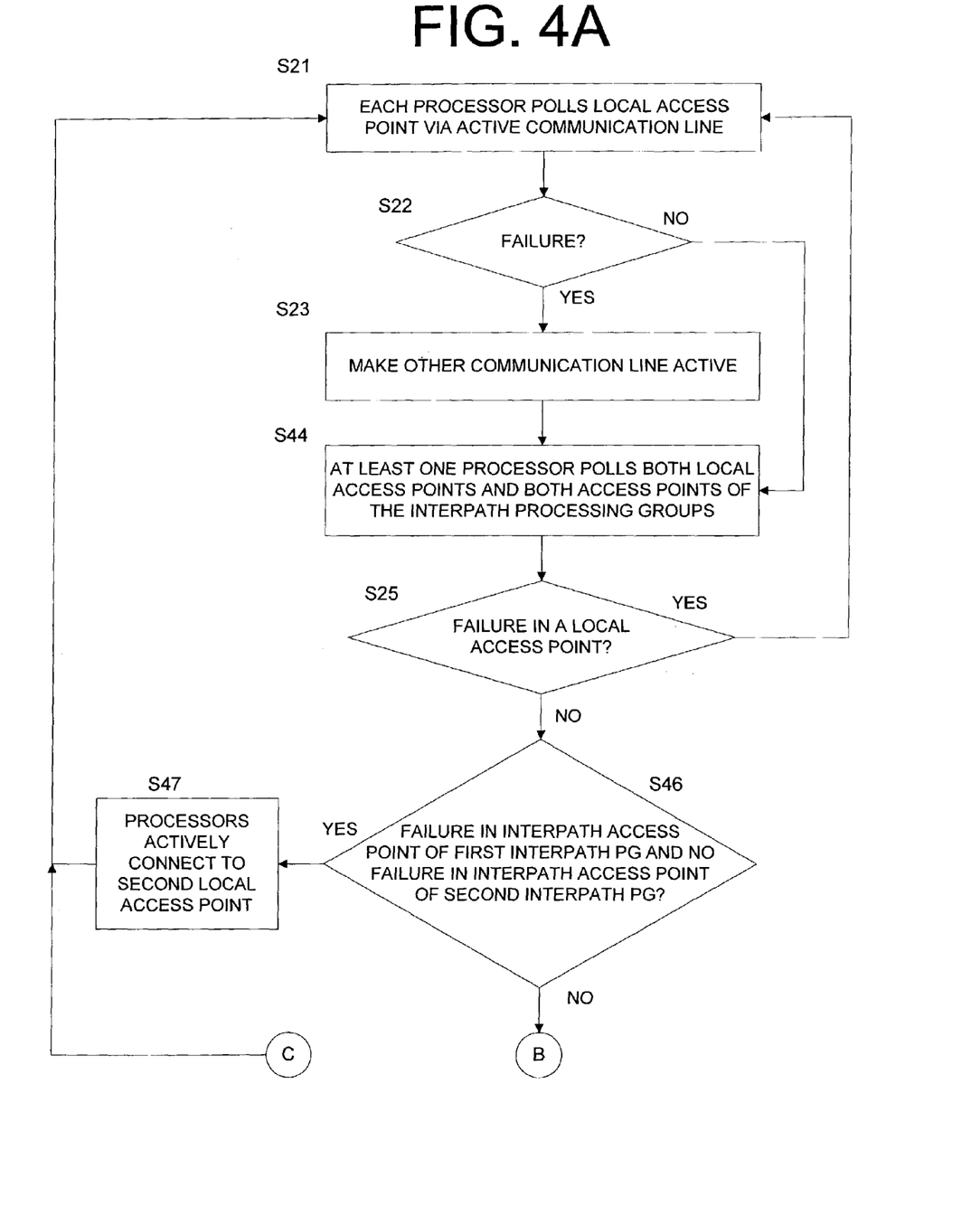
FIGS. 4A and 4B are flowcharts illustrating a fault recovery process for a processing group in a multiprocessor configuration including three or more processing groups, according to an exemplary embodiment of the present invention.
Figure 4B:
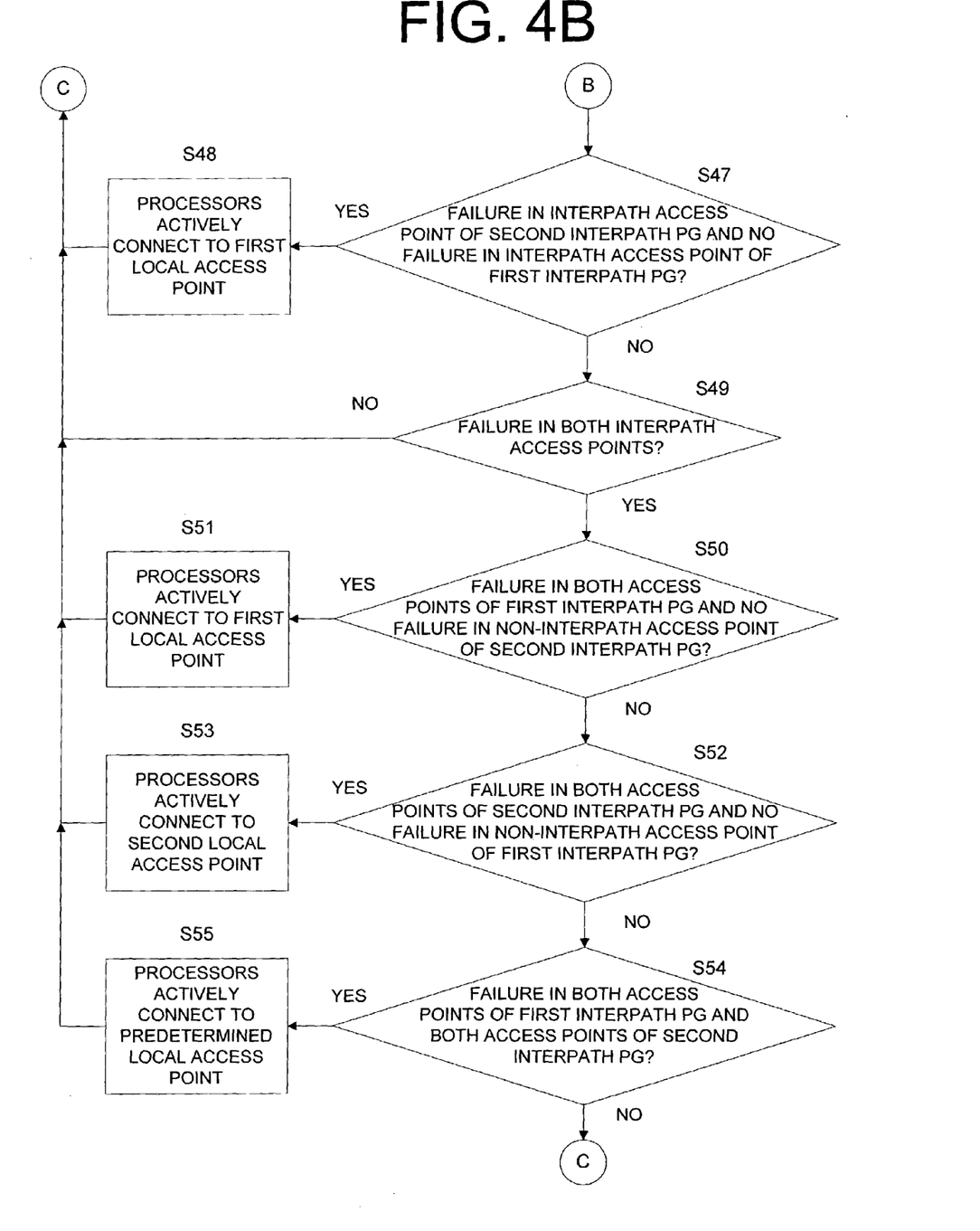

FIGS. 4A and 4B are flowcharts that together illustrate a fault recovery process for a non-interpath processing group PG (e.g., PG3, . . . , PG6) in the multiprocessor configuration of FIG. 3, according to an exemplary embodiment of the present invention. As shown in FIG. 4A, several of these steps are performed similarly as those described above with respect to FIG. 2, and thus, have been given like reference numbers. Thus, a detailed description of these steps will not be repeated.

According to FIG. 4A, each processor 50 in a non-interpath processing group PG performs the same steps S21–S23, as described above in connection with FIG. 2. According to step S44, at least one processor 50 (e.g., control processor CP) also polls the first and second access points AP1 and AP2 of both interpath processing groups PG1 and PG2 to detect failures that may cause a discontinuity in the first and/or second communication paths 10, 20.

For the purpose of polling the Access Points in processing groups PG1 and PG2, interface 51 is used by the control processor CP to poll the first access points AP1 in processing groups PG1 and PG2, whereas communication line 52 is used by the control processor CP to poll the second access points AP2 in processing groups PG1 and PG2. Using these respective lines 51 and 52 ensures that the poll messages are not directed through the interpath connection 30.

In an exemplary embodiment, the polling of the access points AP1 and AP2 of interpath processing groups PG1 and PG2 may be performed periodically, where a fault is detected in response to a respective access point failing to response to N consecutive polling messages (N≧1).

For the purposes of description, it will be assumed that a control processor CP in each non-interpath processing group PG performs the remaining steps illustrated in FIGS. 4A and 4B. However, in an alternative exemplary embodiment, each of the processors 50 of the corresponding non-interpath processing group PG may perform these steps in order to determine to which local access point AP1 or AP2 it should actively connect in response to detected failures.

It should be noted that the control processor CP of a non-interpath processing group PG may control each processor 50 in the respective processing group PG to actively connect to a particular local access point in a manner similar to that described above with respect to FIG. 2.

In decision block S25, as similarly described above with respect to FIG. 2, if the control processor CP detects a failure with respect to local access points AP1 and/or AP2, the fault recovery process is concluded (because each processor 50 already performed the necessary fault recovery in steps S21–S23). Thus, the process returns to step S21 where periodic polling is performed.

However, if decision block S25 determines that no fault occurred with respect to the local access points AP1 and AP2, then the process continues to decision block S46. Accordingly, the control processor CP determines whether a failure has occurred with respect to the interpath access point (AP1) of the first interpath processing group PG1 and whether no failure has occurred with respect to the interpath access point (AP2) of the second interpath processing group PG2. If these conditions are met, the control processor CP controls each processor 50 in the processing group to actively connect to the local second access point AP2. The fault recovery thus concludes, and periodic polling (step S21) is performed.

If the conditions of decision block S46 is not met, then processing continues to decision block S47 in FIG. 4B. According to decision block S47, the control processor CP determines whether a failure has occurred with respect to the interpath access point (AP2) of the second interpath processing group PG2 and whether no failure has occurred with respect to the interpath access point (AP1) of the first interpath processing group PG1. If these conditions are met, the control processor CP controls each processor 50 in the processing group to actively connect to the local second access point AP1, and fault recovery is concluded. Otherwise, the process continues to decision block S49.

According to decision block S49, a determination is made as to whether a failure has occurred with respect to both interpath access points, i.e., the interpath access point AP1 in the first interpath processing group PG1 and the interpath access point AP2 in the second interpath processing group PG2. If not, then the process is concluded, and the periodic polling of step S21 is performed.

However, if the control processor CP determines that a failure has occurred with respect to both interpath access points, a determination is made with respect to decision block S50. Specifically, the control processor CP determines whether a failure has occurred with respect to the first and second access points AP1 and AP2 of the first interpath processing group PG1 and whether no failure has occurred with respect to the non-interpath access point AP1 of the second interpath processing group PG2. If so, then step S51 is performed, and the control processor CP controls each processor 50 in its processing group PG to actively connect to the local first access point AP1, thus concluding fault recovery. Otherwise, the process continues to step S52.

In step S52, a determination is made as to whether a failure has occurred with respect to the first and second access points AP1 and AP2 of the second interpath processing group PG2 and whether no failure has occurred with respect to the non-interpath access point of interpath processing group PG1. If this is the case, then the control processor CP causes each processor 50 in its processing group PG to actively connect to the local second access point AP2, in accordance with step S53. Fault recovery then concludes, and periodic polling (step S21) resumes.

However, if the control processor CP determines that the conditions of decision block S52 have not occurred, then the fault recovery process continues to decision block S54. According to S54, the control processor CP determines whether a failure has occurred with respect to the first and second access points AP1 and AP2 in both interpath processing groups PG1 and PG2. If so, the control processor CP controls each processor 50 in its processing group PG to connect to either the local first access point AP1 or the local second access point AP2, according to step S55.

Specifically, the multiprocessor configuration of FIG. 3 can be configured such that either the first communication path 10 or second communication paths 20 is chosen as a default communication path for each non-interpath processing group, should a failure occur with respect to the first and second access points AP1 and AP2 of both interpath processing groups PG1 and PG2 (i.e., failures render processing groups PG1 and PG2 inoperative). Thus, if the conditions of step S54 are satisfied, each processor in each of the non-interpath processing groups PG3–PG6 is controlled to actively connect to the same default communication path 10/20, via the corresponding local access point AP1/AP2, in accordance with step S55. After step S55 is performed, periodic polling resumes in step S21.

However, if the conditions of decision block S54 are not met, no recovery action is required, and the polling of step S21 is performed.

The process described above with respect to the flowcharts in FIGS. 4A and 4B is merely illustrative, and should not be construed as limiting the fault recovery process of the present invention. For example, the present invention covers all obvious variations of such algorithms, including algorithms that essentially perform the same steps in a different sequence. The present invention should also be construed to cover any and all fault recovery algorithms that perform different steps that are obvious derivations according to the disclosure provided herein.

Furthermore, while exemplary embodiments include the polling of access points AP1 and AP2 of a processing group PG, it should be noted that one variation of such embodiments would be to poll the processors of the corresponding processing group PG instead. Exemplary embodiments of the present invention thus covers such variations.

Exemplary embodiments of the present invention being thus described, it will be obvious that these embodiments may be varied in many ways. Such variations are not to be regarded as a departure from the spirit and scope of the invention. All such modifications as would be readily apparent to those skilled in the art are intended to be included within the scope of the following claims.

What is claimed is:

1. A multiprocessor configuration comprising:
   a plurality of processing groups connected to form a first communication path and connected to form a second communication path, each processing group including one or more processors; and
   at least one interpath connection connecting the first and second communication paths, and connecting at least two of the processing groups; wherein
   each processing group includes a first access point selectively connecting each of the processors of the processing group to the first communication path and a second access point selectively connecting each of the processors of the processing group to the second communication path.

2. The multiprocessor configuration of claim 1, wherein the first communication path is a first series connection between the processing groups and the second communication path is a second series connection between the processing groups.

3. The multiprocessor configuration of claim 2, wherein the first and second series connections each comprise communication lines connecting the processing groups, the communication lines corresponding to at least one of a local area network (LAN) technology and a wide area network (WAN) technology.

4. The multiprocessor configuration of claim 2, wherein the first and second communication paths and the interpath connection provide for communication between processors in different processing groups even if one processing group fails creating a discontinuity in both the first and second communication paths.

5. The multiprocessor configuration of claim 4, wherein the first and second communication paths and the interpath connection provide for communication between processors in different processing groups even if one or more of the processing groups successively connected in both the first and second communication paths fail.

6. The multiprocessor configuration of claim 1, wherein the first and second communication paths and the interpath connection provide for communication between processors in different processing groups even if one processing group fails creating a discontinuity in both the first and second communication paths.

7. The multiprocessor configuration of claim 1, wherein the plurality of processing groups include a first and second processing group successively connected in both the first and second communication paths, and the first access point of the first processing group is connected to the second access point of the second processing group by the interpath connection.

8. A method for performing fault recovery for a processing group in a multiprocessor configuration, the multiprocessor configuration including a plurality of processing groups connected to form a first and second communication path, each processing group including one or more processors and first and second access points selectively connecting each of the processors to the first and second communication paths, respectively, the multiprocessor configuration further including an interpath connection connecting the first and second communication paths, the method comprising:

polling, at a first processing group, the first and second access points of a second processing group to detect failures that create a discontinuity in at least one of the first and second communication paths; and controlling each of the processors in the first processing group to connect to one of the first and second access points of the first processing group based on the polling step.

9. The method of claim 8, wherein the polling step includes, periodically polling the first and second access points of the second processing group, and detecting a failure when a polled access point fails to respond to being polled.

10. The method of claim 8, wherein the first processing group is connected in series by the first and second communication paths to the second processing group, and the first access point of the first processing group is connected to the second access point of the second processing group by the interpath connection; and the controlling step includes, controlling each of the processors in the first processing group to connect to the first access point of the first processing group when the step a) detects no failure with respect to the first access point of the second processing group and detects a failure with respect to the second access point of the second processing group, and controlling each of the processors in the first processing group to connect to the second access point of the first processing group when the step a) detects failures with respect to both the first and second access points of the second processing group.

11. The method of claim 10, further comprising:

polling, at a third processing group, the first and second access points of the first and second processing groups to detect failures that create a discontinuity in at least one of the first and second communication paths;

controlling each processor in the third processing group to connect to the second access point of the third processing group when the polling step detects a failure with respect to the first access point of the first processing group and detects no failure with respect to the second access point of the second processing group; and controlling each processor in the third processing group to connect to the first access point of the third processing group when the polling step detects no failure with respect to the first access point of the first processing group and detects a failure with respect to the second access point of the second processing group.

12. The method of claim 11, wherein the polling step performed at the third processing group detects failures with respect to both access points connected by the interpath connection; and the method further comprises:

controlling each processor in the third processing group to connect to the first access point of the third processing group when the polling step further detects a failure with respect to the second access point of the first processing group and detects no failure with respect to the first access point of the second processing group;

controlling each processor in the third processing group to connect to the second access point of the third processing group when the polling step further detects no failure with respect to the second access point of the first processing group and detects a failure with respect to the first access point of the second processing group; and controlling each processor in the third processing group to connect to a predetermined one of the first and second access points of the third processing group when the polling step further detects failures with respect to both access points of the first processing group and detects failures with respect to both access points of the second processing group.

13. The method of claim 8, wherein the second processing group is connected in series by the first and second communication paths to a third processing group, and the first access point of the second processing group is connected to the second access point of the third processing group by the interpath connection;

the polling step further polls the first and second access points of the third processing group to detect failures that create a discontinuity in at least one of the first and second communication paths; and the controlling step includes, controlling each processor in the first processing group to connect to the second access point of the first processing group when the polling step detects a failure with respect to the first access point of the second processing group and detects no failure with respect to the second access point of the third processing group; and controlling each processor in the first processing group to connect to the first access point of the first processing group when the polling step detects no failure with respect to the first access point of the second processing group and detects a failure with respect to the second access point of the third processing group.

14. The method of claim 13, wherein the polling of the access points of the second and third processing groups detects failures with respect to both access points connected by the interpath connection; and the method further comprises:

controlling each processor in the first processing group to connect to the first access point of the first processing group when the polling step further detects a failure with respect to the second access point of the second processing group and detects no failure with respect to the first access point of the third processing group;

controlling each processor in the first processing group to connect to the second access point of the first processing group when the polling step further detects no failure with respect to the second access point of the second processing group and detects a failure with respect to the first access point of the third processing group; and controlling each processor in the first processing group to connect to a predetermined one of the first and second access points of the first processing group when the polling step further detects failures with respect to both access points of the second processing group and detects failures with respect to both access points of the third processing group.

15. The method of claim 14, wherein the polling of the access points of the second and third processing groups includes, periodically polling the first and second access points of each of the second and third processing groups; and detecting a failure when a polled access point fails to respond to being polled.

* * * * *